Feb. 14, 1961 W. H. DU SHANE 2,971,589
HITCH DEVICE
Original Filed March 26, 1953 5 Sheets-Sheet 1

INVENTOR.
WALLACE H. DU SHANE
BY
*C. H. Parker + R. C. Johnson*
ATTORNEYS Feb. 14, 1961 W. H. DU SHANE 2,971,589
HITCH DEVICE
Original Filed March 26, 1953 5 Sheets-Sheet 3

INVENTOR.
WALLACE H. DU SHANE
BY
ATTORNEYS

Feb. 14, 1961 W. H. DU SHANE 2,971,589
HITCH DEVICE

Original Filed March 26, 1953 5 Sheets-Sheet 5

INVENTOR.
WALLACE H. DU SHANE
BY
ATTORNEYS

United States Patent Office 2,971,589
Patented Feb. 14, 1961

1

2,971,589

HITCH DEVICE

Wallace H. Du Shane, Waterloo, Iowa, assignor, by mesne assignments, to Deere & Company, a corporation of Delaware Continuation of abandoned application Ser. No. 344,865, Mar. 26, 1953. This application Mar. 1, 1957, Ser. No. 643,262

27 Claims. (Cl. 172—239)

This application is a continuation of my copending application, Serial No. 344,865, filed March 26, 1953 for Hitch Device, now abandoned.

The present invention relates generally to agricultural implements and more particularly to tractor-carried and tractor-propelled implements carrying one or more ground-working tools or the like.

The object and general nature of the present invention is the provision of an implement hitch and control means particularly adapted for use with tractors and implements having three-point connection draft links, which includes upper and lower link means and suitable control mechanism and draft-transmitting means whereby the ground-engaging tool means is more or less freely movable in a generally vertical direction about a virtual hitch point or center of rotation, relative to the tractor, that lies generally adjacent the rear axle of the tractor, whereby in operation over uneven ground, such as over ridges, through swales and the like, the implement remains generally parallel to the ground surface, and it is a further object of this invention to provide means whereby the implement may be raised and lowered, as into and out of a transport position, by means providing for a movement of the implement generally about a virtual hitch point or center of rotation that lies well forward relative to the tractor.

Still further, a feature of the present invention is the provision of a hitch device of the general character mentioned above, so constructed and arranged that the implement may be raised or lowered for operating at different depths, with means associated with the draft linkage whereby the greater the depth of operation the farther forward relative to the tractor the virtual hitch point or center of rotation of the implement is disposed.

An additional feature of this invention is the provision of means for adjusting the draft linkage control mechanism so as to provide the proper line of draft for various kinds of implements, some of which may require a low line of draft for proper operation while others may require a relatively high hitch point.

A further feature of this invention is the provision of hitch means especially constructed and arranged to provide for a low line of draft when the tool or too's enter the ground, and a further feature of this invention in this connection is the provision of means interconnected with the tractor power lift for changing the virtual hitch point when the tool means is, for example, shifted from its working position into its lifted or transport position.

These and other objects and advantages of the present invention will be apparent to those skilled in the art after a consideration of the following detailed description, taken in conjunction with the accompanying drawings, in which.

Figures 1, 6:
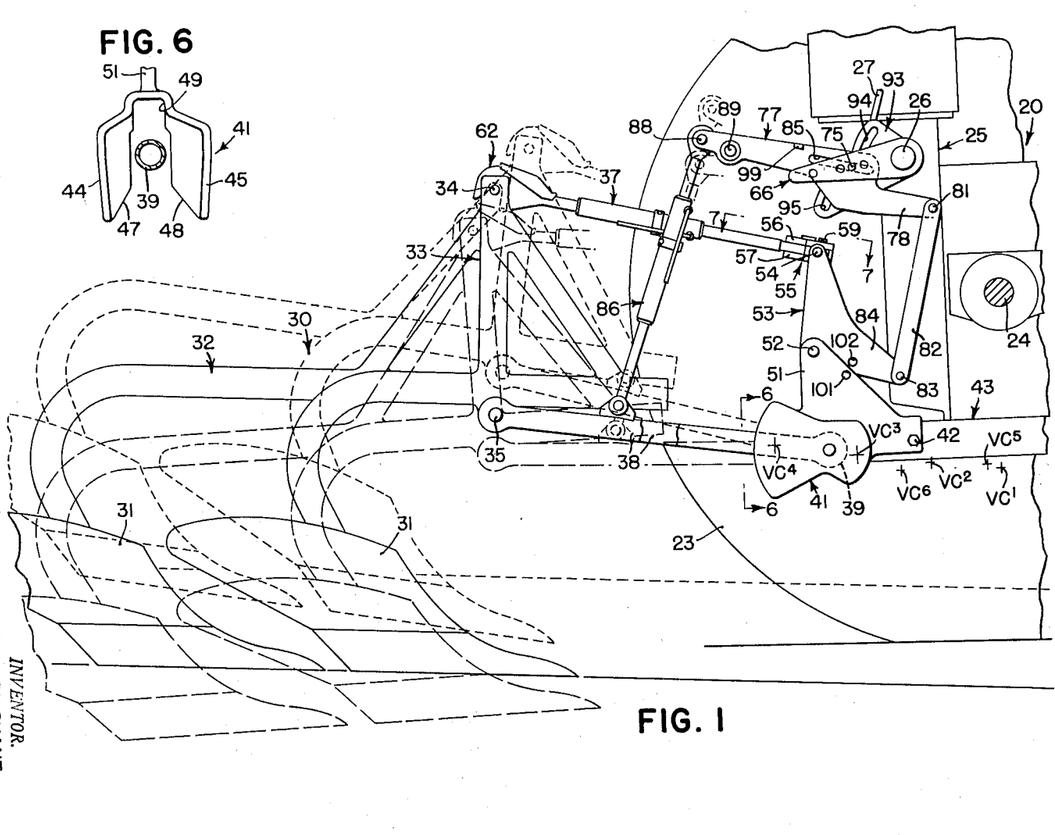
Figure 1 is a side view of an implement and hitch mechanism in which the principles of the present invention have been incorporated, the propelling tractor being shown only fragmentarily and the implement being illustrated as a two-bottom plow in normal operation.
Figure 6 is a fragmentary sectional view taken along the line 6—6 of Figure 1.

Referring first to Figure 1, the present invention has been shown as incorporated in a tractor and two plow outfit. The tractor is indicated in its entirety by the reference numeral 20 and includes a relatively narrow body supporting a power plant of any suitable type, the latter acting through transmission means to drive rear traction wheels 23 that are supported on the laterally outer ends of axle shafts 24. The power plant also is connected to actuate a power lift mechanism 25 that includes, among other things, a transverse rockshaft 26 and means including a valve lever 27 for manually operating the power lift to rock the shaft 26 in one direction or the other by power. The power lift shaft is arranged to move through two ranges, one being a depth-controlling range and the other being a lifting range, the rockshaft or power lift operated member 26 being adapted to be held in any selected position within the lifting range and, when it is desired to lift the implement into a transport position, the rockshaft 26 is rocked into and/or through its lifting range.

Figure 2:
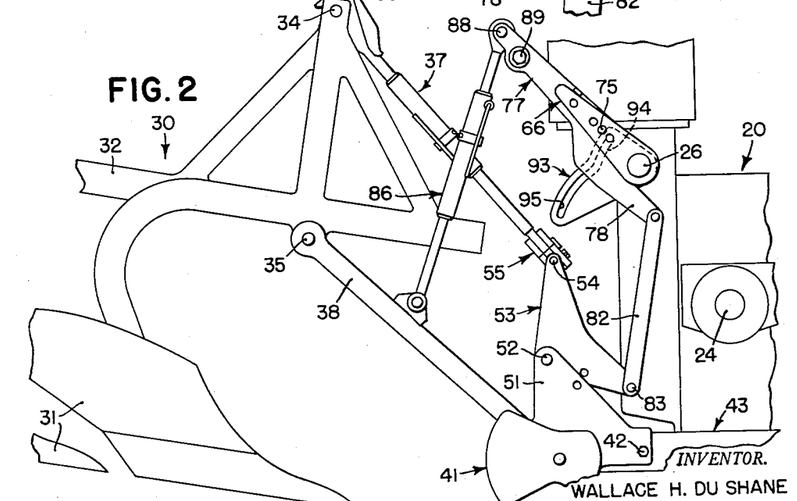
Figure 2 is a view similar to Figure 1, showing the positions and relations of the parts when the implement is fully raised into a transport position.

The implement is indicated in its entirety by the reference numeral 30 and comprises ground-working tool means in the form of two moldboard plow bottoms 31 connected in any suitable way to a frame or beam structure 32. The forward portion of the frame or beam structure carries an upwardly extending mast section 33 providing an upper connecting point 34 and two lower laterally spaced apart connection points 35 to which upper and lower link means 37 and 38 are adapted to be swingably connected. The upper and lower connection points 34 and 35 are formed to include ball-type connectors whereby the implement and the links 37 and 38 may swing generally laterally relative to the tractor 20. The links 37 and 38 and the implement 30 may also be swung generally vertically relative to the tractor. The forward end portion 39 of each of the lower links 38 is connected through a bracket member 41 with the lower portion of the tractor. Preferably, each bracket member 41 is bolted, as at 42, to the drawbar support 43 that forms a part of the tractor 20. Each bracket 41 is provided with side sections 44 and 45 that are spaced apart angularly at their lower portions and converge upwardly, as at 47 and 48, respectively, thereby providing an upwardly narrowing space 49 receiving the forward end 39 of the associated draft link 38. The brackets 41 are arranged in this way so that, when the links 38 are in their lowered or operating position, as in Figures 1 and 6, they are permitted to move laterally through a considerable angle, but when the links are in an upper position, as in Figure 2, which occurs when the implement is raised into its transport position, the lateral swinging of the lower links 38 is limited. In this way, during transport, the implement 30 is held against lateral displacement.

Figures 7, 8, 9, 10:
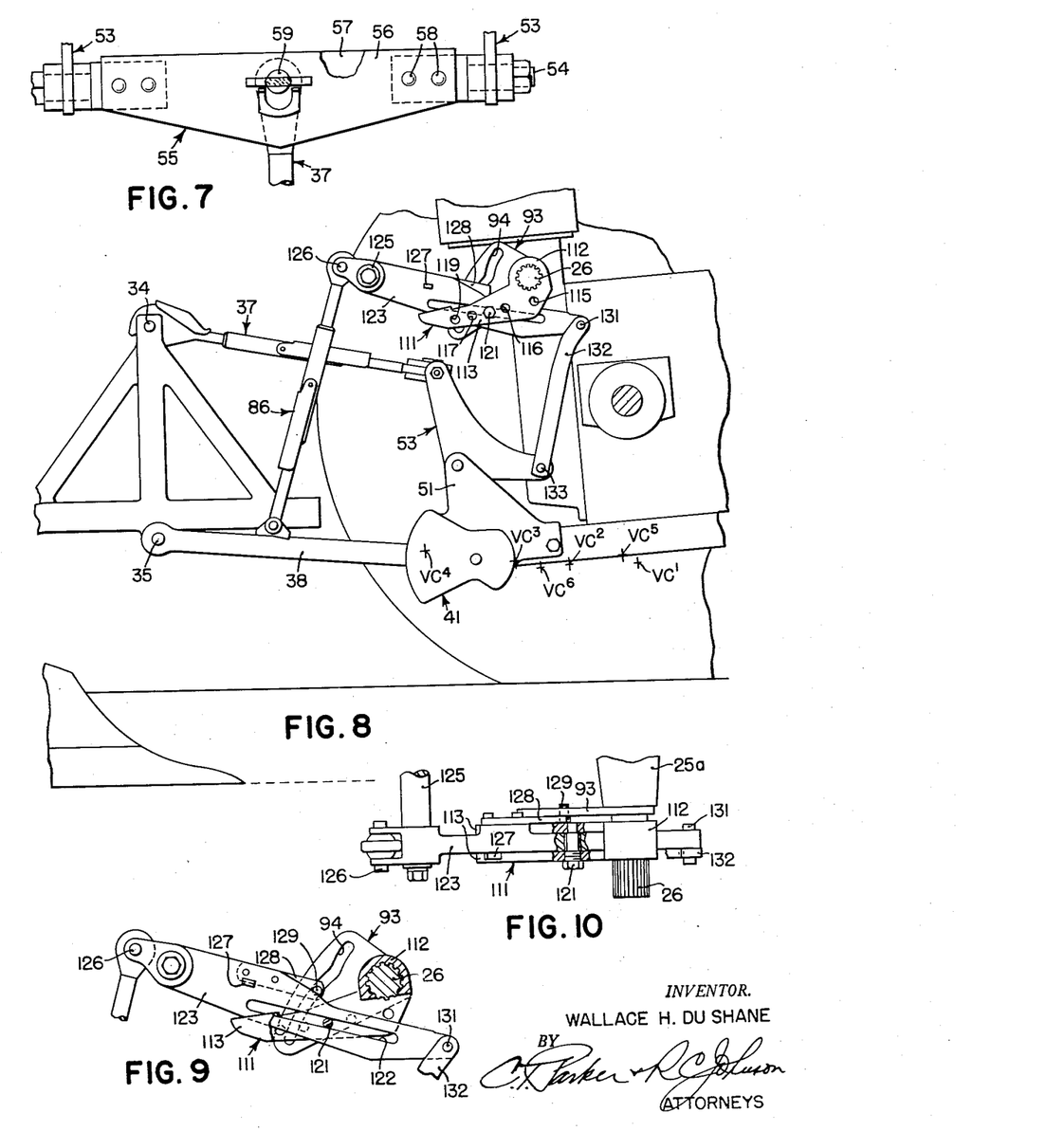
Figure 7 is a fragmentary plan view taken generally along the line 7—7 of Figure 1.
Figure 8 is a view similar to Figure 1, showing a modified form of construction having certain advantages over the construction shown in Figure 1.
Figure 9 is an enlarged fragmentary view showing the details of the line of draft and virtual hitch point adjusting mechanism incorporated in the implement shown in Fig. 8.
Figure 10 is a top or plan view of the mechanism shown in Figure 7.

Each of the brackets 41 is extended upwardly, as at 51, and apertured to receive a pivot 52 on which an associated bell crank member 53 is swingably mounted for movement about a generally transverse axis. The upper arm of each of the two bell cranks 53 is apertured to receive an associated pivot member 54 that forms a part of a cross-shaft structure 55 (Fig. 7). The latter includes, not only the two pivot members 54, but also upper and lower reenforcing plates 56 and 57 securely fixed, as by rivets 58, to the inner ends of the pivot members 54, and a vertical removable pivot member 59 that serves as a pivot connection receiving the forward end of the upper link means 37, the latter thus being swingable laterally relative to the crossbar structure 55. The rear end of the upper link means 37 is provided with a quick-detachable hook member 62 by which the rear end of the link member 37 may be connected with the ball connector at the upper attachment point 34 on the implement frame.

Secured to each end of the power lift rockshaft 26 is a lift lever 66 that includes a pair of lever arms 67 and 68 and a central hub section 69 that is splined or otherwise constructed and arranged to be fixed rigidly to the rockshaft 26. Each of the lever arms 67 and 68 is provided with a plurality of openings 71, 72, 73, and 74, these openings in the two lever arms being disposed in transverse alinement, respectively. A fulcrum pin 75 is disposable in any of the pairs of alined openings and rockably receives a lever 77 that is disposed at an intermediate point between the lift arms 67 and 68. The lever 77 is extended forwardly, as at 78, underneath the hub 69 and is pivotally connected, as at 81, to a generally vertically extending link 82 that is pivotally connected at its lower end, as at 83, to the forward arm 84 of the associated bell crank 53. Each lever 77 is provided with a generally longitudinally extending slot 85 that receives the associated fulcrum pin 75, and the rear end of each lever 77 is connected by a generally vertically disposed link member 86 with the lower draft link 38 at that side of the implement. Preferably, the rear end of each of the levers 77 is bifurcated, as at 87, and apertured to receive a pivot 88 that extends through a ball connector or the like carried at the upper end of the associated lifting link 86. Either or both of the lifting links 86 may be made longitudinally adjustable, and likewise the upper link means 37 may be made longitudinally adjustable by any suitable means. The two levers 77 are rigidly connected together by a torsion bar 89, and by virtue of this construction, the two levers 77, one at each side of the tractor, are constrained to move together and to act as one part. Each lever 77, with the associated link 82 and bell crank 53, constitutes motion transmitting means connecting the power operated lift lever 66 with the lift link 86 and upper link means 37 differentially, whereby for example, for a given movement of the power lift arm 66 the links 37 and 86 may move differently.

Figures 3, 4, 5:
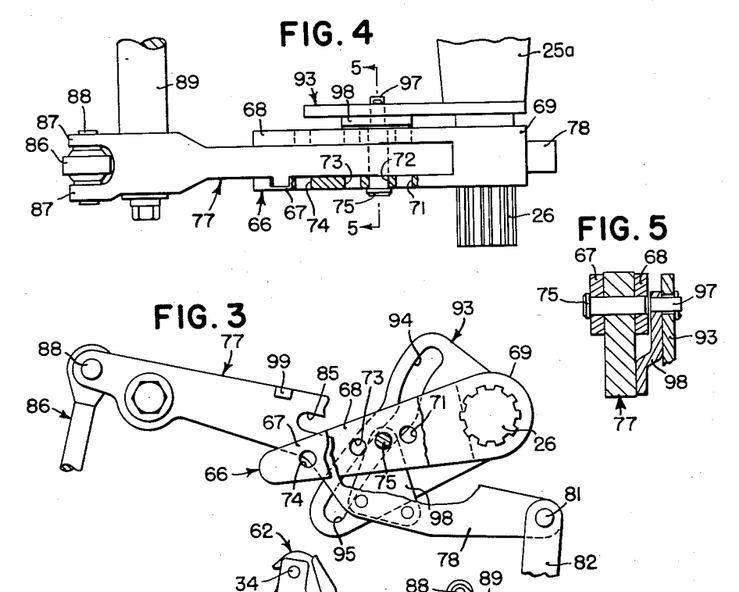
Figure 3 is an enlarged fragmentary view of the cam mechanism and associated parts for varying the effective or virtual hitch point of the implement connection with the tractor, and also the line of draft, in accordance with changes in the depth of operation.
Figure 4 is a top or plan view of the mechanism shown in Figure 3.
Figure 5 is a sectional view taken along the line 5—5 of Figure 4.

At each side of the tractor, the power lift housing, indicated at 25a in Fig. 4, carries a cam section 93 rigidly secured thereto in any suitable manner. The cam section 93 is provided with a first cam slot 94 that is arcuate about the axis of the rockshaft 26, and a second cam slot 95 that is shaped as best shown in Figure 3. The slots 94 and 95 are interconnected and receive a pin 97 that is carried on an arm 98 rigidly fixed to and forming a part of the associated lever 77. Thus, as the power lift arm 66 is raised and lowered, as by operation of the rockshaft 26, the pin 97, moving in the slots 94 and 95, acts to shift the associated lever 77 bodily relative to the associated fulcrum pin 75. Thus, as the lift arms 66 move through their depth-adjusting range, the pins 97, sliding in the lower cam slots 95, serve to shift the arms 77 relative to the associated fulcrum pins 95. This constitutes ratio changing means, since changing the position of the lever 77 relative to the fulcrum pin 75, changes the ratio of movement of one end of the lever 77 relative to the corresponding movement of the other end. However, when the power lift arms 66 move through their transport range, as represented by the arcuate slots 94, at which time the outer ends of the lift arms 66 engage the stops 99 carried by the levers 77, the latter move bodily with the lift arms 66 through the lifting range of the tractor power lift mechanism.

The operation of the present invention as so far described is substantially as follows. Figure 1 shows the implement, a two-bottom moldboard plow, in a normal operating position, plowing about eight inches deep. For implements of this kind, the fulcrum pins 75 are placed in the lift arm openings 72 for average soil conditions. As the outfit travels over the ground surface, the plow 30 is free to float up or down, relative to the tractor and the arms 66, to accommodate any unevenness of the ground surface, as indicated in dotted and broken lines in Figure 1.

Upward movement of the plow relative to the tractor, as about the center $VC^2$ (Figure 1), will permit an upwardly directed movement of the lift links 86, rotating the levers 77 clockwise about the fulcrum pins 75. This allows the links 82 to move downward, permitting the bell cranks 53 to rotate in a clockwise direction, the upper link means 37 to move forwardly, and the implement 30 to tilt forwardly. This tips the points of the plow bottoms downwardly and acts to increase the suction of the plow bottoms and to cause the same either to increase the depth of operation, if the aforesaid upward movement of the implement were caused by some means other than ground irregularities, or to tend to cause the plows to follow generally parallel to the surface of the ground when the tractor passes through a swale or the like. On the other hand, if the implement 30 should swing downwardly relative to the tractor, the levers 77 will swing in a counterclockwise direction, as viewed in Fig. 1, about the fulcrum pins 75, and this will exert an upwardly directed pull through the links 82 against the forwardly extending bell crank arms 74, swinging the bell cranks 53 in a counterclockwise direction and moving the upper link means 37 rearwardly, thus tipping the plow upwardly. In this way, the depth of plowing is decreased if the aforesaid downward movement were caused, not by ground irregularities, but by some other factor, such as the implement striking a soft spot in the ground, or the like. On the other hand, if the downward movement of the implement relative to the tractor were due to the latter passing over the top of a ridge or the like, the plow would be tilted in a direction to maintain the same generally parallel to the ground surface as the plow approaches the top of the ridge. It will be noted from Figure 1, that in the up-and-down swinging of the implement relative to the tractor discussed above, the implement may be considered as moving about a virtual center of rotation or a virtual hitch point $VC^2$ that lies fairly close to the rear axle of the tractor, which permits the implement to remain nearly parallel to the ground as the outfit passes over rolling land or the like.

Changing the fulcrum pins 75 from the holes 72 to some other holes, as to the holes 71, 73, or 74, in the lift arms 66 provides different ratios of motion transmission between the lower links 38 to the upper links 37 through the bell cranks 53 and associated parts. For example, placing the fulcrum pins in the forward holes 71 of the lift arms 66 provides, during normal operation, a virtual center of rotation located relative to the tractor at the point VC¹ which, it will be noted, lies substantially forwardly of the hitch point VC² that is provided when the fulcrum pins 75 are disposed in the openings 72. When the pins 75 are disposed in the openings 73, the virtual center of rotation VC³ is located about as indicated in Figure 1, generally rearwardly of the center VC², and when the pins 75 are disposed in the openings 74, the virtual center of rotation VC⁴ is located, as shown in Figure 1, generally rearwardly of the center VC³.

The holes 71, 72 and 73 will be used for the majority of such implements as moldboard plows, disk plows, disk harrows, bedders and the like, the forwardmost holes 71 being used for hard soil conditions and the holes 73 being used for relatively light soils. The holes 74 provide the highest line of draft and are used for shallow-operating implements, such as rear cultivators or the like.

During operation with the fulcrum pins 75 in position in the selected holes 71—74, as required by the particular implement, soil conditions, or both, the pitch or suction of the implement can be adjusted by movement of the rock-shaft 26 from one position to the other within its depth-adjusting range. For example, looking first at Figure 1, if it should be desired to increase the suction of the implement, this can be accomplished by operating the rockshaft 26 in a counterclockwise direction, as viewed in Figure 1, the corresponding movement of the lift arms 66 in a downward direction permitting the levers 77 to move downwardly. The forward ends 78 move immediately downwardly, since the rear ends cannot at once move downwardly, because the implement cannot be forced bodily downwardly into the ground. The downward movement of the front ends of the levers 77 act to swing the bell cranks 53 in a clockwise direction (Fig. 1), resulting immediately in a forward or downward tilting of the implement and an increase in the suction of the tools. This will result in the tools moving downwardly without delay to an increased depth of operation. Raising the power lift arms 66 will have the opposite result, tipping the implement upwardly and decreasing the suction of the tools. Furthermore, according to the principles of the present invention, the aforesaid upward or downward movement of the power lift arms 66 serves, in addition to varying the suction of the tools, to change the position of the virtual hitch point or center of rotation. This occurs because, for example, as the lift arms 66 move downwardly, the pins 97, guided by the stationary slots 95 on the tractor, serve to shift the levers 77 bodily in a generally fore-and-aft direction relative to the associated fulcrum pins 75, thereby changing the proportion of fore-and-aft movement transmitted by the bell cranks 53 and associated parts to the upper link means 37 by a given amount of vertical swinging of the lower links 38. For example, with the pins 75 in the holes 72, if the depth of operation is increased from eight inches to ten inches, the virtual hitch point or center of rotation moves from VC² to VC⁵, and if the depth of operation is decreased to about six inches, for example, the virtual hitch point or center of rotation moves from VC² to VC⁶. In other words, as the lift arms 66 are lowered to provide for an increased depth of operation the resulting rearward movement of the levers 77 causes a generally forward shift of the virtual center of rotation of the implement, and when the power lift arms 66 are raised to provide a more shallow depth of operation, the virtual center of rotation is shifted generally rearwardly.

When it is desired to raise the tool into a transport position from any operating position, such as the one indicated by way of example, in Figure 1, the operator actuates the power lift mechanism of the tractor and causes the rockshaft 26 to be rocked in a clockwise direction, raising the lift arms 66 into their lifting range. cam slots 94, the outer or rear ends of the lift arms came slots 94, the outer or rear ends of the lift arms 66 come up against the stops 99. After contact is established, the levers 77 then move bodily with the lift arms and no longer function as levers. However, the initial movement of the lift arms 66 toward their lifted position first causes the front ends of the levers 77 to be elevated, which acts through the bell cranks 53 to shift the upper link means 37 rearwardly and tip or tilt the implement rearwardly, causing the points of the plow bottoms to be angled upwardly. This facilitates the emergence of the tools from the ground. By the time the arms 66 engage the stops 99, further lifting movement applied to the implement 30 through the arms 66 raises the implement 30 generally bodily about a forward virtual hitch point and more or less in parallel positions, this hitch point lying well forward on the tractor, as at the point of convergence of the lines of the links 37 and 38 extended, because the levers 77 no longer pivot on their pins 75, and the movement of the points or pivots 81 during the raising action merely carries these points or pivots under the rockshaft 26, thereby causing very little movement of the bell cranks 53. The raising movement of the implement takes place generally about a virtual hitch point where the fore-and-aft extending lines of the upper and lower links 37 and 38 intersect. Thus, the raising of the implement is effected without excessive power requirements, particularly since the rear end of the implement is not raised very much higher than the front end. This provides a nearly parallel action during the lifting range of the power lift, whereby heavier implements may be lifted easier than in prior constructions with which I am familiar.

Generally speaking, the hitch mechanism and associated parts described above and shown in Figures 1–7 provide means whereby during normal operation the virtual center of rotation or virtual hitch point of the implement is located at the rear of the tractor and substantially underneath the rear axle thereof. The advantage of this arrangement is that the implement remains substantially at all times generally parallel to the surface of the ground when passing over rolling land. However, when the implement is to be lifted, the virtual hitch point is shifted to a point well forward on the tractor, with the result that a nearly parallel lift is provided. In this way, the heavier implements may be lifted readily because the rear end need not be lifted as high as would be the case if they were lifted about some virtual center of rotation adjacent the rear axle of the tractor.

In some cases, the implement may require an extremely low line of draft, and in such cases the link 82 may be disconnected at the upper pin 81 and the pin 81 inserted in a pair of holes 101 and 102 formed, respectively, in the bracket 41 and the adjacent portion of the bell crank 53. This locks the bell crank 53 against rotation, and as a result thereof, the virtual center of rotation lies generally at the point where the fore-and-aft extending lines of the upper and lower links 37 and 38 intersect, which is well toward the front of the tractor. When the parts are arranged in this way, the implement, in effect, floats generally vertically until the stop 99 comes into contact with the associated lifting arm 66, or until the latter is operated in the raising direction and contacts the stop 99 to raise the implement into a transport position.

A modified form of the present invention is shown in Figures 8–10. In this form of the invention certain simplifications have been made in the line-of-draft adjusting levers 77, and the necessity for disconnecting the link 82 from the associated lever 77 and locking the bell crank 53 in position has been eliminated.

Referring now to Figures 8–10, parts that are identical, or substantially so, with the parts described above have been indicated by the same reference numerals. Secured to each end of the power lift rockshaft 26 is a lifting arm 111 that is provided with a hub section 112 splined to the associated end of the shaft 26 and an arm section 113 having five openings 115—119, each adapted to receive a pivot pin 121 that is adapted to extend through a slot 122 formed in the associated lever 123. Like the form of the arm 77 described above, the arm 111 is bifurcated, providing two sections 113 and pairs of openings 115—119, the lever 123 extending between the lift arm sections 113. The rear or outer ends of the levers 123 are apertured to receive a torsion bar 125 that rigidly interconnects the two levers 123. The upper end of the associated lifting link 86 is pivotally connected, as at 126, with the rear or bifurcated end of the lever 123. A stop 127 is formed on each of the levers 123, and fixed to the innermost section 113 of the lifting arm 111 is a bracket 128 carrying a fixed pin 129 that is disposed in the slot 94, 95 of the associated fixed cam member 93. The forward end of each of the levers 123 is pivotally connected, as at 131, to a generally vertical link 132 that, at its lower end, is connected by a pivot 133 to the forward arm of the associated bell crank 53.

In operation, the openings 116—119 function substantially the same as the openings 71—74 described above. However, in this form of the invention, when the pin 121 is placed in the opening 115 with an end extending into the slot 122, the lever 123 is locked to its associated lift arm 111. With the parts arranged in this way, very little movement is imparted to the bell crank 53 by the front end of the lever 123, and therefore when the shaft 26 is rocked, the implement moves generally about a virtual center of rotation disposed well forwardly on the tractor.

The present invention as embodied in the construction illustrated in Figures 1–10 and described above provides, in effect, an implement hitch arrangement which maintains a substantially constant depth of operation without the use of any external source of power for forcibly raising or lowering the implement. However, the hitch construction described above is also especially adapted for use with an automatic control mechanism which utilizes power from the tractor, such as properly controlled fluid under pressure, as from a pump driven by the tractor engine, and one advantage of the present invention in this connection is the feature wherein an automatic control is made possible through the use of the above described hitch linkage with an external source of power, such as a hydraulic ram unit, in which the latter is not called upon to actually lift the implement for the purpose of decreasing the draft or dropping the implement to increase the draft. Briefly, according to the present invention, means is provided, utilizing the above described hitch mechanism, whereby the hydraulic unit is provided, not for bodily raising or lowering the implement, but only to change its line of draft and its suction, or angle of operation relative to the ground surface. The hydraulic system of the present invention therefore requires considerably less power.

Figure 11:
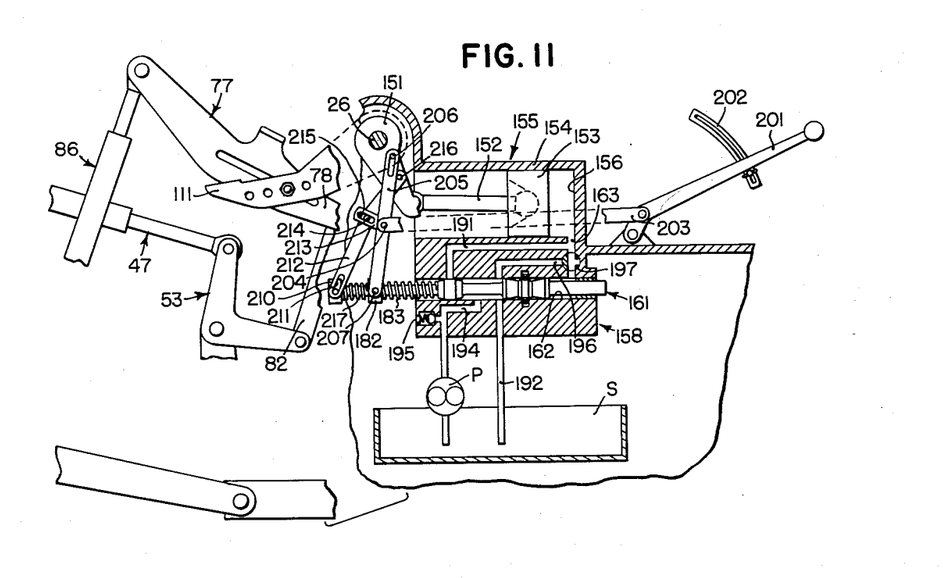
Figure 11 is a view somewhat similar to Figure 1, showing a hydraulically operated automatic depth control for the hitch mechanism disclosed in Figure 1.
Figure 12:
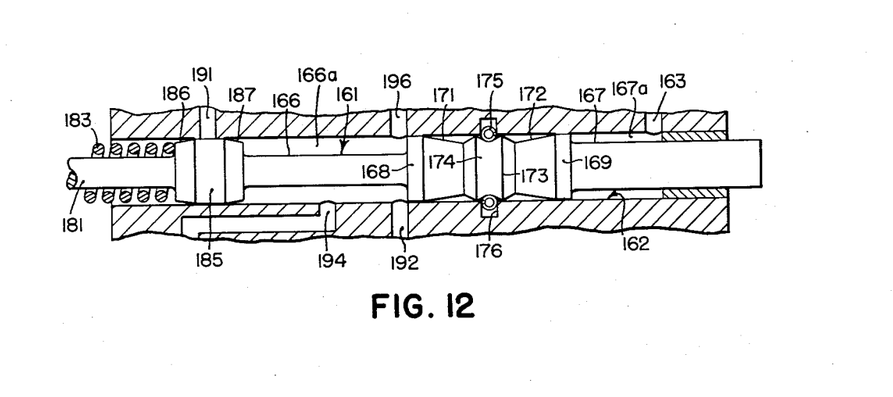
Figure 12 is an enlarged view of the ram-controlling valve means.

Referring now to Figure 11, secured to the rockshaft 26, preferably inside the body or housing of the tractor, is an actuating arm 151 that at its lower end is pivotally connected with a piston rod 152 that at its forward end abuts against a socket formed in a piston 153. The latter is disposed for sliding movement within a cylinder 154, the piston and cylinder thus forming the principal parts of a ram unit indicated in its entirety by the reference numeral 155. The unit 155 is single acting, and the piston 153 in operation moves toward and away from the closed end of the cylinder 154. The closed end of the cylinder is indicated at 156. The flow of fluid to and from the cylinder 155 is under the control of a valve unit indicated in its entirety by the reference numeral 158. The valve unit 158 includes a valve member 161 disposed for sliding movement in a valve chamber 162, which latter chamber may be formed in the same member as the cylinder 154, if desired. A bore or conduit 163 leads from one end of the valve chamber 162 into communication with the closed end 156 of the cylinder 154.

The valve member 161 is provided with a pair of reduced sections 166 and 167, and between these sections the valve member 161 is provided with enlarged cylindrical portions 168 and 169 that are spaced apart axially and are connected by tapering sections 171 and 172 at their central annular portion 173 in which a groove 174 is formed. A garter or detent spring 175 encircles and is lodged partly within the groove 174 and is held against lateral displacement with respect to the valve housing by any suitable means, as by being disposed in an annular stationary chamber 176. At its forward end, the valve member 161 extends forwardly out of the housing in which the valve chamber 162 is formed, and at its other end the valve member 161 is provided with an elongated stem section 181 of reduced diameter. A collar 182 is slidable on this portion of the valve body, exteriorly of the housing and a relatively heavy spring 183 is disposed between the collar 182 and the facing portion of an enlarged cylindrical valve section 185, the valve member having tapered sections 186 and 187 at opposite sides of the cylindrical portion 185. The outer end of the valve chamber 162 is shown as communicating with a sump or the like, indicated somewhat diagrammatically in Figure 11 by the reference character S.

The valve chamber section 167a, formed by the reduced valve portion 167, communicates through the bore or passage 163 with the closed end of the cylinder 154. The passage 163 is connected by a bore or conduit 191 with the chamber section 166a, formed by the reduced section 166 of the valve member 161. In the normal or closed position of the valve member 161, the cylindrical section 185 closes off the end of the conduit or passageway 191. A third passage or bore 192 extends from the right end of the valve chamber 166a downwardly and outwardly to the sump S. A fourth conduit or passage 194 extends from the generally central portion of the chamber 166a to a source of hydraulic pressure, such as a pump P indicated diagrammatically in the drawings as a constant-running gear pump. A high-pressure relief valve is shown at 195 for protecting the pump and the associated fluid lines against abnormally high pressures. A fifth bore or passage 196, which may register in diametrically opposite relation with respect to the passage 192, extends from the inner end of the valve chamber section 166a to a three-way valve 197 that is incorporated in the passage or conduit 163. In the position of the three-way valve shown in Figure 11, the passage 196 is closed off and the valve chamber 167a is subjected directly to the pressure in the closed end 156 of the cylinder 154. This provides automatic depth control, as will be described below. The three-way valve 197 may be turned clockwise (Figure 11) so as to connect the line 196 with the line 163 below the three-way valve, thereby isolating the valve unit from the pressure within the cylinder 154. This provides for position-responsive control as pointed out below.

A hand controlled part in the form of a lever 201 is mounted in a suitable location on the tractor and is movable to different positions along a sector 202. A fulcrum link 203 is connected at one end with the hand lever 201 and at the other end is connected by a pivot pin 204 or the like to an intermediate point on a first servo link 205. The upper end of the link 205 is slotted and is connected to a pivot pin 206 carried by the actuating arm 151 on the rockshaft 26. The other end of the servo link 205 is pivotally connected to trunnions 207 or the like formed on the collar 182 described above. A second collar 210 is fixed rigidly to the outer end of the reduced stem 181 of the valve member 161 and pivotally receives, as through a slotted connection 211, the lower end of a second servo link 212. The latter is connected by a short link 213 with the pivot 204 at the rear end of the fulcrum link 203, said pivotal connection including a pin 214 carried by the link 212 and a slot 215 formed in the link 213.

The upper end of the link 212 is pivoted directly to the actuating arm 151, as at 216. A spring 217 is disposed between the collars 182 and 210.

The operation of the form of the invention just described is substantially as follows. Assuming that the implement and hitch structure are in a normal operating position, such as is indicated in full lines in Figure 1, it will be noted that the compressive force in the upper link 37, acting through the bell crank 53, will exert a pull through the link 82 against the forward end 78 of the lever 77. At the same time, the downward reaction of the soil against the implement will exert a tension through the lift links 86 against the rear ends of the arms 77. Thus, a downward load is imposed upon each of the lift arms 111 which tends to rock the shaft 26 in a counterclockwise direction, and this downward load or force is opposed by the pressure of the fluid within the closed end 156 of the cylinder 154. The pressure in this part of the ram is transmitted through the passageway 163 against the shouldered portion 169 on the inner end of the valve member 161, and this force is counteracted by the force of the spring 183. The latter may therefore be referred to as a draft spring since it is constructed and arranged to sustain normal draft forces, holding the valve member 161 in its normal or neutral position, with the garter spring 173 lying in the groove 174 and with the passages 192 and 194 in direct communication with one another, whereby the oil from the pump P is free to flow through the valve chamber and back to the sump and reservoir without material restriction.

If for some reason the implement tends to go too deep, the force transmitted through the links 37, 86 and 132 will increase, thus increasing the pressure in the closed end 156 of the cylinder 154. This increased pressure acts against the shouldered portion 169 of the valve member 161 and will force the latter outwardly, or rearwardly, against the action of the draft spring 183. This movement of the valve member 161 closes the passage 192, whereby movement of oil to the reservoir or sump is terminated, and opens the passage 191 to the valve chamber section 166a, which receives oil under pressure from the pump through the line 194. However, the flow of oil from the latter through the chamber section 166a and the line 191 is restricted by virtue of the tapered section 187 of the valve member 161. Thus, the operation of the pump P moves the piston 153 at a relatively slow rate of movement outwardly, thus rocking the shaft 26 in a clockwise direction, which tilts the implement rearwardly and thus reduces its suction and raises the line of draft.

This provides, automatically, substantially the same action as is performed by a manually controlled rocking of the shaft 26 (Figure 1) in a counterclockwise direction.

As the implement moves into a position of lesser depth, as a result of the action just mentioned, the draft decreases and the forces transmitted by the links 37, 86 and 132 decreases, whereupon the pressure within the closed end 156 of the cylinder 154 decreases and the spring 183 returns the valve member 161 to its normal or neutral position. Due, however, to the new position of the actuating arm 151, carrying the pin 206 upon which the upper end of the link 205 is pivoted, the pressure within the system is slightly greater than it was when the valve originally moved into a raising position; that is, the spring 183, at the time the valve 161 is returned to its neutral position, is compressed to a slightly greater degree than before. Thus, any tendency for the system to overcorrect for the above-mentioned increase in draft is eliminated. This prevnts hunting of the controlling mechanism.

If for some reason the implement tends to operate too shallow, the pressure in the closed end of the cylinder decreases, and as a result the spring 183 forces the valve member 161 to the right. This restrictively, through the tapered section 186, opens the line 191 to the reservoir or sump S, and as a consequence thereof the rockshaft 26 and lift arms 111 are permitted to rotate in a counterclockwise direction, and this increases the suction of the implement and lowers the line of draft to the implement. As the implement then goes deeper, the draft reaction causes an increase in the pressure of the closed end of the cylinder 154 which, acting against the shouldered section 169 of the valve 161 through the passageway 163, acts to return the valve member 161 to a neutral or closed position at a point where the pressure in the cylinder 154 is slightly less than it was when the valve originally moved to its lowering position. This, for the same reason as mentioned above, serves to prevent hunting of the controlling mechanism. In this way, therefore, the link 205 and associated parts constitutes a compensating mechanism that prevents overcontrolling of the hydraulic means.

When it is desired to raise the implement into its transport position, the hand lever 201 is raised into its uppermost position. This acts through the fulcrum link 203 to immediately swing the link 205 in a clockwise direction with respect to its upper pivotal connection with the actuating arm 151, the resulting movement of the outer or lower end of the link 205 acting to shift the valve member 161 to the left, moving the cylindrical section 185 and the tapered section 187 away from the passage 191, at the same time causing the cylindrical section 168 to close off the low pressure line 192. Thus, the full pump pressure is immediately available to raise the implement into its transport position. However, as the rockshaft 26 and the arms 111 and 151 reach their uppermost positions, the second servo link 212, the upper end of which is moved rearwardly as the actuating arm 151 is moved rearwardly, acts positively to return the valve member 161 to its normal or closed position, thus preventing any overtravel of the piston in the raising direction. This position of the parts is shown in Figure 13.

Figure 13:
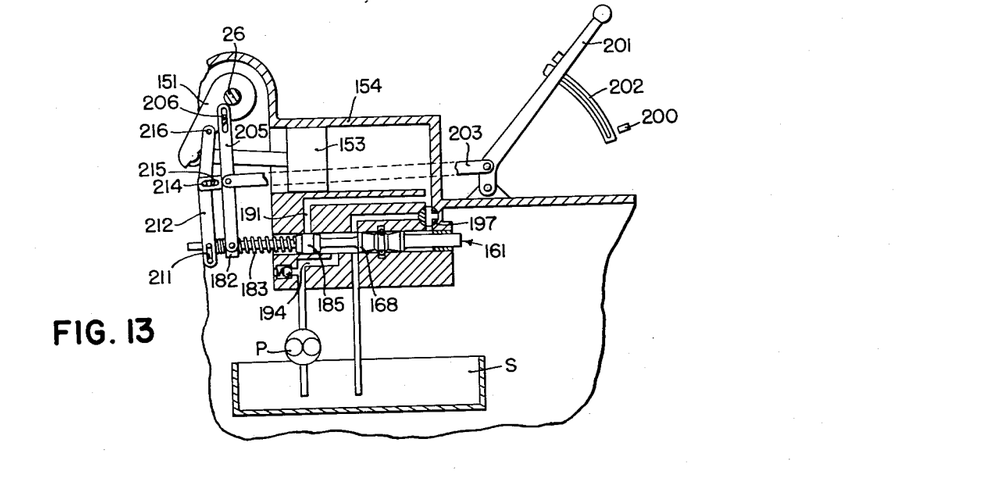
Figure 13 is a fragmentary view showing the parts of the hydraulic mechanism in the positions they occupy when the implement is raised.
Figure 14:
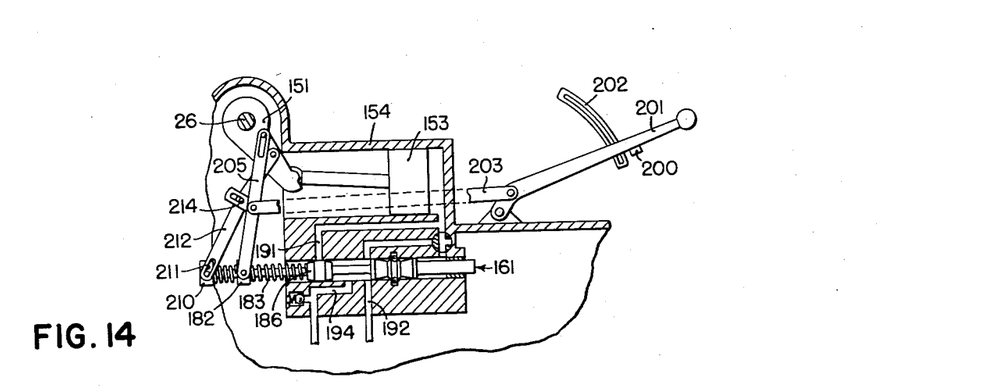
Figure 14 is similar to Figure 13, showing the parts in the lowered position.

With the implement in its raised position, the outfit is easily transported from field to field, and when it is next desired to operate the implement, the hand lever 201 is swung downwardly into its lowered position as against a depth-controlling adjustable stop 200 (Figure 13). At the beginning of the lowering action, the downward movement of the hand lever 201 acts first through the link 212 to move the valve member 161 to the right, or forwardly, such a distance that the tapered portion 186 moves inwardly, or to the right, beyond the port 191. Thus, the implement is lowered toward the ground at a fairly rapid rate since the passage 191 is relatively unrestricted. This momentarily permits the implement to have an increased angle of suction and low line of draft for quick entry. As the implement continues to lower, the actuating arm 151 acts through the link 212 to shift the valve member 161 rearwardly with a positive action. At the same time, the link 205 is swung in a counterclockwise direction so that at its lower end the latter acts against the spring 183 to establish a normal draft-resisting force. As the implement reaches its normal operating position, the draft increases and this acts through the passageway 163 against the valve member 161 and restores the latter to a neutral or normal position, substantially as shown in Figure 11.

If it should be desired to eliminate the draft-responsive action, all that it is necessary to do is to turn the three-way valve 197 into a position cutting off the flow of fluid from the inner end of the cylinder through the passage 163 to the inner end of the valve member. Therefore, in this position of the valve 197, the system is no longer compensated by the draft, but the system is still responsive to the position of the actuating arm 151, through the link 205.

While I have shown and described above the preferred structure in which the principles of the present invention have been incorporated, it is to be understood that my invention is not to be limited to the particular details, shown and described above, but that, in fact, widely differnt means may be employed in the practice of the broader aspects of my invention.

What I claim, therefore, and desire to secure by Letters Patent is:

1. In a mounted implement, the combination of a tractor having a power-operated member adapted to be moved to and held in different selected positions, a ground-working means, including a frame, upper and lower, generally vertically swingable link means connected at their rear ends with said implement frame, a bell crank pivotally mounted on the tractor and having one arm pivotally connected with the forward end of said upper link means, a lever pivotally connected at a mid-point with said power-operated member and swingable in generally opposite directions about an axis at said midpoint relative to said power operated member when the latter is held in selected position, means at one side of said axis connecting one end of said lever with the lower link means, and means at the other side of said axis pivotally connecting the other end of said lever with the other arm of said bell crank.

2. The invention set forth in claim 1, further characterized by means connected with said lever and said power-operated member for changing the point of pivotal connection therebetween.

3. The invention set forth in claim 1, further characterized by a pivot connecting said lever and said power-operated member, and means shiftably connecting said pivot with one of said lever and member.

4. The invention set forth in claim 3, further characterized by means connected with said power-operated member and actuated by movement thereof relative to the tractor for moving said shiftable pivot.

5. For use with a tractor of the type having a power-operated lift member and an implement of the type that is adapted to be connected with the tractor through upper and lower link means, with a lifting connection acting against said lower link means: the improvement comprising a hitch device that includes motion-transmitting means including a lever for connecting said upper and lower link means whereby up and down swinging of the latter serves to shift said upper link means in a generally fore-and-aft direction, means providing a fulcrum for said lever on said lift member, and means connected with said fulcrum means and the lever for shifting one relative to the other in repsonse to movement of said lift member relative to the tractor.

6. For use with a tractor of the type having a power operated lift member and an implement of the type that is adapted to be connected with the tractor through upper and lower link means, with a lifting connection acting against said lower link means: the improvement comprising a hitch device that includes motion-transmitting means including a bell crank adapted to be mounted on the tractor with one arm connected with the forward end of said upper link means, a lifting arm adapted to be fixed to said power lift member, a lever, a pivot carried by said arm and pivotally supporting said lever at a point between its ends on said arm for relatively free swinging movement, means connecting one end of said lever with the other arm of said bell crank, and means for connecting the other end of said lever with said lower link means.

7. The invention defined in claim 6, further characterized by fulcrum means carried by said lift arm, and means connected with said lever for shifting the latter relative to said fulcrum means by operation of said power lift member.

8. The invention set forth in claim 7, further characterized by said lever shifting means comprising a cam adapted to be fixed to the tractor and engageable with said lever for shifting the latter relative to said fulcrum means.

9. For use with a tractor of the type having a power-operated lift member and an implement of the type that is adapted to be connected with the tractor through upper and lower link means, with a lifting connection acting against said lower link means: the improvement comprising a hitch device that includes motion-transmitting means including a lever for connecting said upper and lower link means whereby up-and-down swinging of the latter serves to shift said upper link means in a generally fore-and-aft direction, means providing a fulcrum for said lever on said tractor, and means connected with said fulcrum means and the lever for shifting one relative to the other in response to movement of said lift member relative to the tractor.

10. For use with a tractor of the type having a power-operated lift member and an implement of the type that is adapted to be connected with the tractor through upper and lower link means, with a lifting connection acting against said lower link means: the improvement comprising a hitch device that includes motion-transmitting means including a lever for connecting said upper and lower link means whereby up-and-down swinging of the latter serves to shift said upper link means in a generally fore-and-aft direction, means providing a fulcrum for said lever on said lift member, and means connected with said lever for shifting the fulcrum thereof relative to said lift member for different positions of the latter.

11. In a mounted implement, the combination of a tractor having a power-operated member, a ground-working means, including a frame, upper and lower, generally vertically swingable link means connected at their rear ends with said implement frame, a bell crank pivotally mounted on the tractor and having one arm pivotally connected with the forward end of said upper link means, a lever pivotally connected at a mid-point with said power-operated member, means connecting one end of said lever with the lower link means, means pivotally connecting the other end of said lever with the other arm of said bell crank, one of said last mentioned connecting means being detachable to permit interrupting the connection between the bell crank and said lever, and means acting against the bell crank for limiting pivotal movement thereof relative to the tractor.

12. The invention set forth in claim 11, further characterized by stop means acting between said lever and said power-operated member to limit the movement of said lever relative thereto.

13. In a mounted implement, the combination of a tractor having a power-operated member, a ground-working means, including a frame, upper and lower, generally vertically swingable link means connected at their rear ends with said implement frame, a bell crank pivotally mounted on the tractor and having a generally vertically extending arm and a generally fore-and-aft extending arm, means pivotally connecting the upper portion of said vertically extending arm with the forward end of said upper link means, means connecting the outer end of the other arm with said power-operated member, lift link means connecting the power-operated member with said lower link means, whereby a forward thrust exerted through the upper link means against said bell crank is transmitted by the latter to the lift link means to apply a raising force to said lower link means, the means connecting the bell crank with the power-operated member including disconnectible parts, and means fixing said bell crank to the tractor when said parts are disconnected.

14. A draft device for connecting an implement having upper and lower connection points with a tractor having a power-operated, implement-lifting and -adjusting member, said draft device comprising upper and lower link means adapted to be pivotally connected at their rear ends with the implement connection points and at their forward ends with the tractor, generally vertically acting lifting means connected with said lower link means, motion-transmitting means pivoted generally at an intermediate point on said power operated member and connected at one end with said lifting means, means connecting the other end of said motion-transmitting means with said upper link means, whereby as said lower link means swings generally vertically said upper link means is shifted generally fore-and-aft, and means connected with said motion transmitting means to shift the pivotal connection of the latter relative to said power operated member so as to vary the proportion of movement of said lifting means relative to the corresponding motion of said upper link means.

15. In a mounted implement, the combination of a tractor having a power-operated member, a ground-working means, including a frame, upper and lower, generally vertically swingable link means connected at their rear ends with said implement frame, a bell crank pivotally mounted on the tractor and having a generally vertically extending arm and a generally fore-and-aft extending arm, means pivotally connecting the upper portion of said vertically extending arm with the forward portion of said upper link means, a lever of the first class connected at one end with said lower link means and at its other end with said generally fore-and-aft extending arm, and means connecting the fulcrum of said lever with said power operated member.

16. In a mounted implement, the combination of a tractor having a power-operated member, a ground-working means including a frame, upper and lower, generally vertically swingable link means connected at their rear ends with said implement frame, a bell crank pivotally mounted on the tractor and having a generally vertically extending arm and a generally fore-and-aft extending arm, means pivotally connecting the upper portion of said vertically extending arm with the forward end of said upper link means, motion-reversing means carried by said power operated member and having generally oppositely movable connections extending from said motion-reversing means to said lower link means and to the generally fore-and-aft extending arm of said bell crank, respectively, whereby a forward thrust exerted through the upper link means against said bell crank is transmitted by the latter to the lift link means to apply a raising force to said lower link means.

17. The combination with a tractor having a fore-and-aft body supported on a transverse rear axle and carrying a transverse lift rockshaft at a level above said axle, and an implement trailing the tractor, of hitch means connecting the implement to the tractor and comprising rearwardly extending lift arm means on the rockshaft, bell crank means separate from the rockshaft and lift arm means and rockably mounted on the tractor on a transverse axis below the level of the tractor rear axle, said bell crank means having first and second arm means, means connecting the implement and the first arm means of the bell crank means for transmitting draft force at least in part to the bell crank means, generally upright force-transmitting means connecting the second arm means of the bell crank means to the lift arm means for transferring said force at least in part to the lift arm means, and lift link means connecting the lift arm means and the implement for transferring a lifting force to the implement.

18. The combination with a tractor having a power lift system that includes lift arm means and power means for raising said lift arm means, and a ground-following implement, of hitch means to connect said implement with the tractor, comprising a pair of lower draft links connected at their rear ends to the implement and at their forward ends to the tractor, lift link means connecting said lift arm means with said draft links, upper link means connected at its rear end to an upper portion of the implement, a bell crank swingably mounted on the tractor and having a generally vertical arm pivoted to the forward portion of said upper link means and a generally horizontal arm connected with said lift arm means by disconnectable means, and means to lock said bell crank to the tractor to prevent movement of the bell crank when said disconnectable means is disconnected.

19. In a mounted implement, the combination of a tractor having a power-operated member, a ground-working means, including a frame, upper and lower, generally vertically swingable link means connected at their rear ends with said impelement frame, a bell crank pivotally mounted on the tractor and having one arm pivotally connected with the forward end of said upper link means, a lever, means pivotally connecting the lever at a midpoint with said power-operated member so that the ends of said lever move in opposite directions relative to said member, means connecting one end of said lever with the lower link means, and means pivotally connecting the other end of said lever with the other arm of said bell crank, up and down swinging of said lower link means resulting, respectively, in fore and aft tilting of said ground-working means.

20. In a tractor mounted implement, the combination of a tractor having a power-operated arm, a ground working means including a frame, draft reaction receiving means connected with said frame and with the tractor and including a first lever fulcrumed on the tractor and having two parts, means connecting one of said parts with said frame, a second lever, means pivotally supporting said second lever on said power operated arm for swinging movement about a point between the ends of said second lever, whereby the latter is swingable relative to the tractor and said power-operated arm, said second lever having one end portion connected with the other part of said first lever, means connecting another portion of said second lever with said power-operated arm and reacting against the latter to transmit a lifting force to said frame, and means connecting the other end portion of the second lever with said frame.

21. The combination with a tractor having a fore-and-aft body supported on a transverse rear axle and carrying a transverse lift rockshaft, and an implement trailing the tractor, of hitch means connecting the implement to the tractor and comprising rearwardly extending lift arm means on the rockshaft, bell crank means separate from the rockshaft and lift arm means and rockably mounted on the tractor for movement relative thereto about a transverse axis, said bell crank means having first and second arm means, means connecting the implement and the first arm means of the bell crank means for transmitting draft force at least in part to the bell crank means, force-transmitting means connecting the second arm means of the bell crank means to the lift arm means for transferring said force at least in part to the lift arm means, and lift link means connecting the lift arm means and the implement for transferring a lifting force to the implement.

22. In a tractor mounted implement, the combination of a tractor having a power-operated arm, a ground working means including a frame, draft reaction receiving means connected with said frame and with the tractor and including a first lever fulcrumed on the tractor and having two parts, means connecting one of said parts with said frame, and means connecting said power-operated arm with the other of said lever parts and with said frame, whereby draft reaction of the implement is transmitted through said power-operated arm to said frame as a lifting force.

23. In a tractor mounted implement, the combination of a tractor having a power-operated member, a ground working means including a frame, generally vertically swingable draft transmitting means connecting said frame with the tractor, lift link means connecting said power-operated member with said generally vertically swingable draft transmitting means, whereby movement of said power-operated member in one direction serves to raise said draft transmitting means and the implement connected therewith, a bell crank, means pivotally mounting the bell crank on the tractor, said bell crank being movable relative to the tractor and having a generally horizontal arm and a generally vertical arm, means connecting the latter arm with said frame so as to receive the draft reaction thereof, and means connecting the generally horizontal bell crank arm with said lift link means and including means reacting against said power-operated member, whereby the reaction of said implement draft is transmitted to said bell crank and acts against said power operated member and through said vertically swingable draft transmitting means to exert a lifting force on the implement.

24. The combination with a tractor including a power operated rockshaft, and an implement trailing the tractor, of hitch means connecting the implement to the tractor, comprising lift arm means on the rockshaft, power means adapted to be extended and retracted and to be held in selected positions, means connecting said power means with said lift arm means, lever means separate from the rockshaft and lift arm means and rockably mounted on the tractor, said lever means having first and second movable portions, means connecting the implement and the first lever portion of said lever means for transmitting draft reaction at least in part to said lever means, force-transmitting means extending upwardly from the second lever portion of said lever means to said lift arm means and thence downwardly to the implement, said force transmitting means reacting against said lift arm means when the power means is held in selected position to transmit said draft reaction to the implement as a lifting force.

25. In a mounted implement, the combination of a tractor having a power-operated member adapted to be held against movement, a ground-working means including a frame, upper and lower, generally vertically swingable link means connected at their rear ends with said implement frame, a bell crank pivotally mounted on the tractor and having a generally vertically extending arm and a generally fore-and-aft extending arm, said bell crank being freely movable relative to said power-operated member, means pivotally connecting the upper portion of said vertically extending arm with the forward end of said upper link means, lever means, pivot means mounting said lever means at an intermediate point for freely swingable movement on said power-operated member, means connecting the outer portion of the fore-and-aft extending bell crank arm with one end of said swingable lever means, and lift link means connecting the other end of said swingable lever means with said lower link means, whereby a forward thrust exerted through the upper link means against said bell crank is transmitted by the latter to the lift link means through the swingable lever means reacting against power operated member, so as to apply a raising force to said lower link means.

26. The combination with a tractor having a fore-and-aft body supported on a transverse rear axle and carrying a transverse lift rockshaft, power means connected with the rockshaft and adapted optionally to rock the latter and to hold the latter against rocking, and an implement trailing the tractor, of hitch means connecting the implement to the tractor and comprising rearwardly extending lift arm means on the rockshaft, lever means separate from the rockshaft and lift arm means and rockably mounted on the tractor, said lever means being mounted on the tractor for movement relative to the rockshaft when the latter is held by said power means in a given position relative to the tractor, said lever means having first and second arm means, means connecting the implement and the first arm means of the lever means for transmitting draft force at least in part to the lever means, force-transmitting means connecting the second arm means of the lever means to the lift arm means for transferring said force at least in part to the lift arm means, and lift link means connecting the lift arm means and the implement for transferring at least part of said draft force to the implement as a lifting force.

27. The combination with a tractor having a power operated rockshaft and an implement trailing the tractor, of hitch means connecting the implement to the tractor and comprising lift arm means on the rockshaft, means connecting the lift arm means with the implement, a first lever fulcrumed on the tractor and having two parts, means connecting one part of said first lever with the implement so as to receive draft reaction therefrom, a second lever, means supporting said second lever on the tractor whereby the second lever is swingable relative to the tractor and said lift arm means generally about a point between the ends of said second lever, means connecting one end portion of said second lever with the other part of said first lever so as to receive said draft reaction transmitted thereto from said implement by said first lever, and means connecting another portion of said second lever with said lift arm means and reacting against the latter and acting through the means connecting the lift arm means with the implement to transmit a lifting force to said implement.

References Cited in the file of this patent

UNITED STATES PATENTS

| | | |
|---|---|---|
| 1,348,995 | Himes | Aug. 10, 1920 |
| 1,464,130 | Ferguson | Aug. 7, 1923 |
| 2,356,231 | Ferguson | Aug. 22, 1944 |
| 2,515,637 | Dooley et al. | July 18, 1950 |
| 2,611,304 | Toland | Sept. 23, 1952 |
| 2,631,515 | McRae | Mar. 17, 1953 |
| 2,678,596 | Todd | May 18, 1954 |
| 2,754,738 | Brown | July 17, 1956 |
| 2,785,616 | Jones | Mar. 19, 1957 |

FOREIGN PATENTS

| | | |
|---|---|---|
| 155,707 | Australia | Mar. 16, 1954 |